(12) United States Patent
Watt

(10) Patent No.: US 7,549,059 B2
(45) Date of Patent: Jun. 16, 2009

(54) TRANSFERRING DATA VALUES VIA A DATA BUS OR STORING DATA VALUES USING A SELECTABLE REPRESENTATION

(75) Inventor: Simon Charles Watt, Cambridge (GB)

(73) Assignee: ARM Limited, Cambridge (GB)

( * ) Notice: Subject to any disclaimer, the term of this patent is extended or adjusted under 35 U.S.C. 154(b) by 1500 days.

(21) Appl. No.: 10/179,020

(22) Filed: Jun. 26, 2002

(65) Prior Publication Data
US 2004/0003128 A1  Jan. 1, 2004

(51) Int. Cl.
*G06F 11/30* (2006.01)
(52) U.S. Cl. ..................................... 713/193
(58) Field of Classification Search ............... 713/193; 380/109
See application file for complete search history.

(56) References Cited
U.S. PATENT DOCUMENTS

| | | | |
|---|---|---|---|
| 5,650,825 A * | 7/1997 | Naimpally et al. ......... 348/465 |
| 6,744,746 B1 * | 6/2004 | Bartelme ................... 370/329 |
| 6,873,706 B1 * | 3/2005 | Miyazaki et al. ............. 380/30 |
| 6,882,730 B1 * | 4/2005 | Herbert et al. ............. 380/283 |
| 7,086,087 B1 * | 8/2006 | Kaminaga et al. ............ 726/16 |
| 2002/0029346 A1 * | 3/2002 | Pezeshki et al. ............ 713/190 |

FOREIGN PATENT DOCUMENTS

EP    691750 A1 *  1/1996

* cited by examiner

*Primary Examiner*—Emmanuel L Moise
*Assistant Examiner*—Ali S Abyaneh
(74) *Attorney, Agent, or Firm*—Nixon & Vanderhye P.C.

(57) ABSTRACT

Data values being stored and transferred within a data processing system 8 have a selectable representation, such as true and complement, as indicated by an accompanying representation specifying bit. This assists in obscuring the operation and the power signature of the device in a manner that improves security.

40 Claims, 2 Drawing Sheets

US 7,549,059 B2

TRANSFERRING DATA VALUES VIA A DATA BUS OR STORING DATA VALUES USING A SELECTABLE REPRESENTATION

BACKGROUND OF THE INVENTION

Field of the Invention

This invention relates to the field of data processing systems. More particularly, this invention relates to a technique for transferring data values via a data bus and the format with which data values are stored.

It is known to provide data processing systems with the intent that the data processing operations performed and data values processed by such systems are difficult to determine from examination of the system. A good example of such a secure system is a smart card.

Smart cards are commonly used to control access to subscription services, such as satellite television. Such smart cards have secure encryption keys stored thereupon to allow a properly authorised user to decode received satellite television signals. It is highly desirable that the encryption keys and other security measures taken to ensure that only authorised paying customers can decode the satellite television signals are maintained confidential to prevent their unauthorised use. To this end, considerable effort is expended in making it difficult to determine the data processing operations being performed and the data values being manipulated within a smart card whilst it is operating by observing the smart card.

One type of security attack that can be made upon smart cards relies upon an analysis of the power being consumed by the smart card over time as it performs its processing operations. Small variations in the power consumed occur due to differences in the processing operations being performed and the data values being processed. It is possible with careful analysis of such power consumption data to compromise the security of such smart cards. Measures which can help increase the resistance of data processing systems to such power analysis attacks and generally obscure their operation are strongly desirable.

SUMMARY OF THE INVENTION

Viewed from one aspect the present invention provides apparatus for processing data, said apparatus comprising:
 a data source operable to supply a data value to be processed;
 a destination operable to receive said data value; and
 a data bus operable to transfer a representation of said data value between said data source and said destination; wherein
 one or more representation specifying bits are associated with said data value transferred on said data bus, said one or more representation specifying bits specifying using which of a plurality of different representations said data value is transferred via said data bus between said data source and said destination.

The invention recognises that power analysis security attacks can be made more difficult and the general operation of the system obscured by transferring data values (which may be one or more bits in length) around the system using a selectable representation of the data value concerned selected in dependence upon representation selecting bits associated with that data value. Thus, the same data value being transferred may be represented in more than one way resulting in a different number of bus lines having to change state and so resulting in a different power consumption for the transfer depending upon which representation is used. This effectively obscures the "power signature" of a data value being transferred on a data bus and the operation in general. The data source may be any data source mechanism for a data value and the destination may be any circuit to which a data value is being transferred.

In preferred embodiments the data source is a register and the destination is a data value processing circuit.

Whilst it is possible to use the present technique to simply transfer the data values using the selectable representation and then transform the data values back into their native form prior to processing, preferred embodiments of the invention recognise that the data values need not be changed from the representation in which they have been transferred providing the data processing operations performed upon them are adapted in dependence upon the representation being used. This further obscures the power signature and general operation.

Whilst the processing of some data values in their non-true representation form may be readily achieved, it is difficult for some other processing operations and accordingly preferred embodiments serve to control whether or not a data value is changed in representation prior to being processed in dependence upon which processing operation is to be performed. In some situations it is desirable to change the data value back into its native representation for some data processing operations to be performed.

Whilst the present technique can be used to obscure the transfer of data values via a data bus and accordingly use the different representations during the transfer, preferred embodiments of the invention also store the data values using the selected representation. This helps to obscure the "power signature" of reads and writes to the store as well as obscuring the general operation of the system.

Whilst it will be appreciated that it may be possible to have some central store of indications identifying which representations are being used in which parts of the system for which data values, preferred embodiments of the invention simplify the system by associating the representation specifying bits with the data values such that they are transferred together with the representation of the data value when this is transferred via the data bus.

A particularly convenient way of associating the representation specifying bits with the representation of a data value concerned is to store the representation specifying bits alongside the representation of the data value concerned, e.g. extending the register by a number of bits required to additionally store the representation specifying bits.

Whilst it will be appreciated that the present technique could be used to protect particular data values and particular registers, such as those known to be storing highly confidential data values (e.g. master encryption keys), preferred embodiments of the invention are ones in which the register is part of a register bank with the technique being used for data value transfers in and out of that register bank during processing operations.

In a similar manner, the data value processing circuit could be dedicated to a particular purpose, but in preferred embodiments the technique is used in systems where the data value processing circuit is an arithmetic logic circuit operable to perform arithmetic and logical operations upon data values in general.

It will be appreciated that the plurality of different representations that may be used for a data value could take many different forms depending upon how many bits it was desired to dedicate to serve as representation specifying bits and how much additional processing logic it was acceptable to incorporate to handle the transformations between representations.

A particularly effective and low overhead solution is one in which the one or more representation specifying bits are a complement bit specifying whether the data values are represented in a true form or in a complement form. Only a single bit needs to be used to indicate which form is being employed. The "power signatures" associated with data values being transferred and manipulated relate to the number of signals which change state between consecutive cycles. This true and complement form is a good way of obscuring this.

In order to select which representation should be used for which data value, preferred embodiments of the invention utilise a representation selecting input which receives a representing selecting signal for selecting the representation to be used. This allows different implementations of the same hardware to differently control which representations are used for which data values in a manner that makes it more difficult for a person trying to analyse the behaviour of the systems to compromise their security.

Depending upon the circumstances in which the system is being used and the user's requirements, the representation selecting signal could be a random signal, a quasi-random signal or a program controlled signal as desired, as well as possibly taking other forms.

Viewed from another aspect the present invention provides a method of processing data, said method comprising the steps of:
  supplying from a data source a data value to be processed; and
  transferring a representation of said data value between said data source and a destination via a data bus; wherein one or more representation specifying bits are associated with said data value supplied by said data source, said one or more representation specifying bits specifying using which of a plurality of different representations said data value is transferred via said data bus between said data source and said destination.

Viewed from a further aspect the invention provides apparatus for processing data said apparatus comprising:
  a store operable to store a data value and one or more representation specifying bits associated with said data value, said one or more representation specifying bits specifying using which of a plurality of different representations said data value is stored within said store.

Viewed from a still further aspect the invention provides a method of processing data, said method comprising the steps of:
  storing a data value and one or more representation specifying bits associated with said data value, said one or more representation specifying bits specifying using which of a plurality of different representations said data value is stored within a store.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
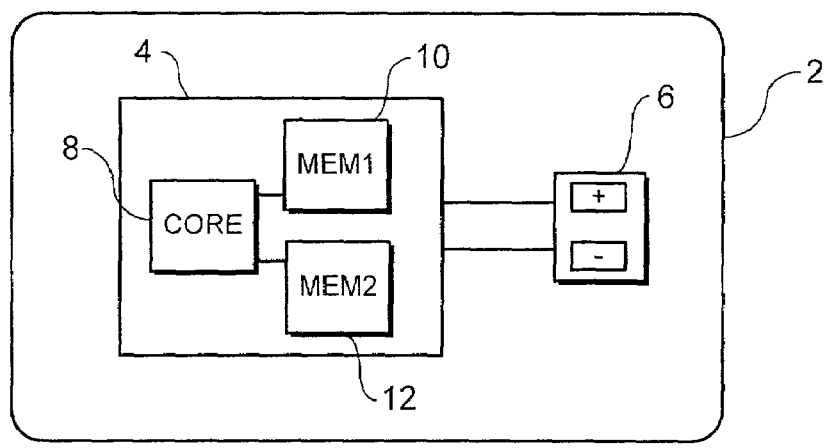
FIG. 1 schematically illustrates a smart card including data processing circuitry.

FIG. 1 illustrates a smart card 2 which incorporates data processing circuitry 4 supplied with power via power contact pads 6. The smart card 2 is a secure device and/or a cryptographic device in that it is intended to keep data and its processing operation secure and uses cryptographic techniques as part of this. The processing circuitry 4 includes a processor core 8 together with memories 10, 12 which store data values. The processor core 8 will typically include a register bank comprising a plurality of registers holding data values to be manipulated as well as various data value processing circuits, such as multipliers, shifters, adders, logical operation circuits etc. The registers of the register bank may serve as a data source and as a destination for data values being transferred.

In operation, the smart card 2 is supplied with power via its power contact pads 6 and this serves to provide energy to the processing circuits 4 to conduct their processing operations, such as security validation, electronic money transfer etc. It is known that by observing the variation of power consumed with time as the smart card 2 operates it is possible to gain insights into the processing operations being performed and the data values being manipulated in a manner that can compromise the security of the smart card.

Figure 2:
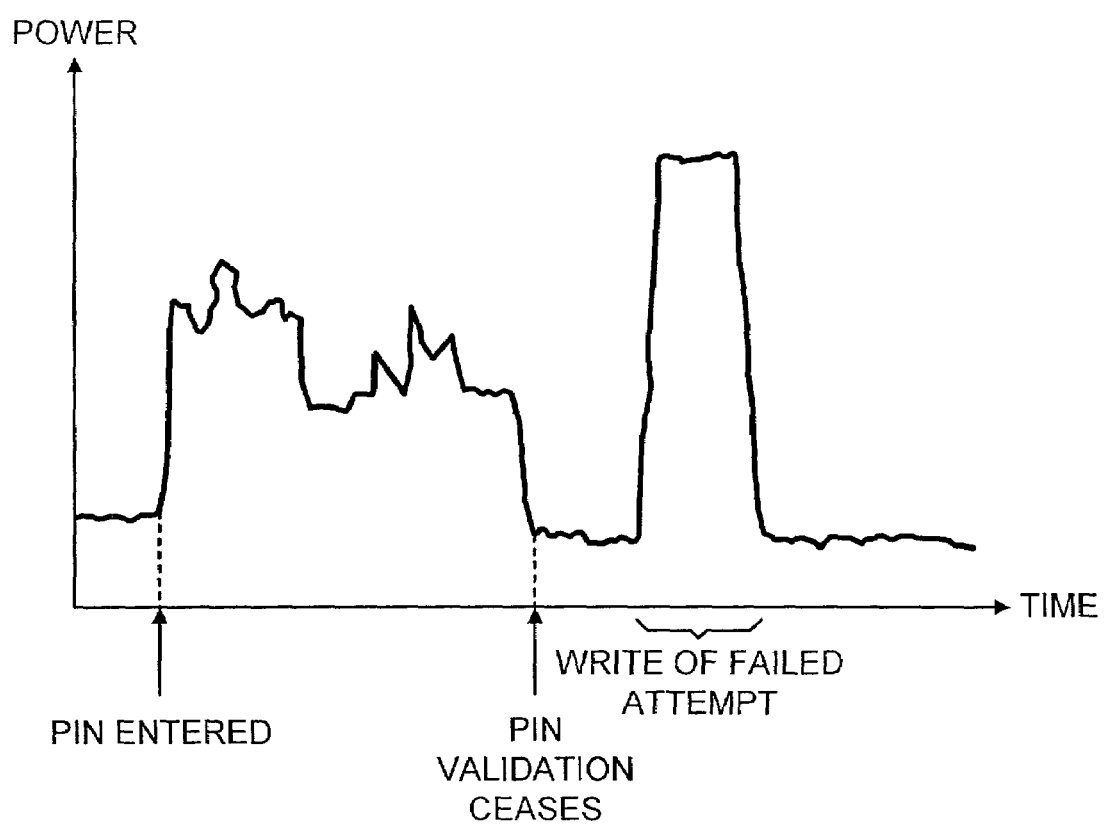
FIG. 2 illustrates a power consumption trace that may be used to analyse the power signature of a device to determine information regarding its operation.

FIG. 2 is a graph illustrating the variation of power consumed with time during the operation of a smart card 2. With experience and careful study the variations in power consumed can be ascribed to different processing events, and possibly data values, arising within the smart card 2. As illustrated, an initial increase in power consumption may correspond to a PIN number being entered. A subsequent decrease in power consumed corresponds to the validation processing of the PIN number ceasing. A subsequent relatively short duration peak in power consumption corresponds to the writing of a value indicating whether or not the validation of the PIN number succeeded or failed. The information that an experienced engineer may gain from the analysis of a graph such as that of FIG. 2 can be used to compromise the security of a smart card.

Figure 3:
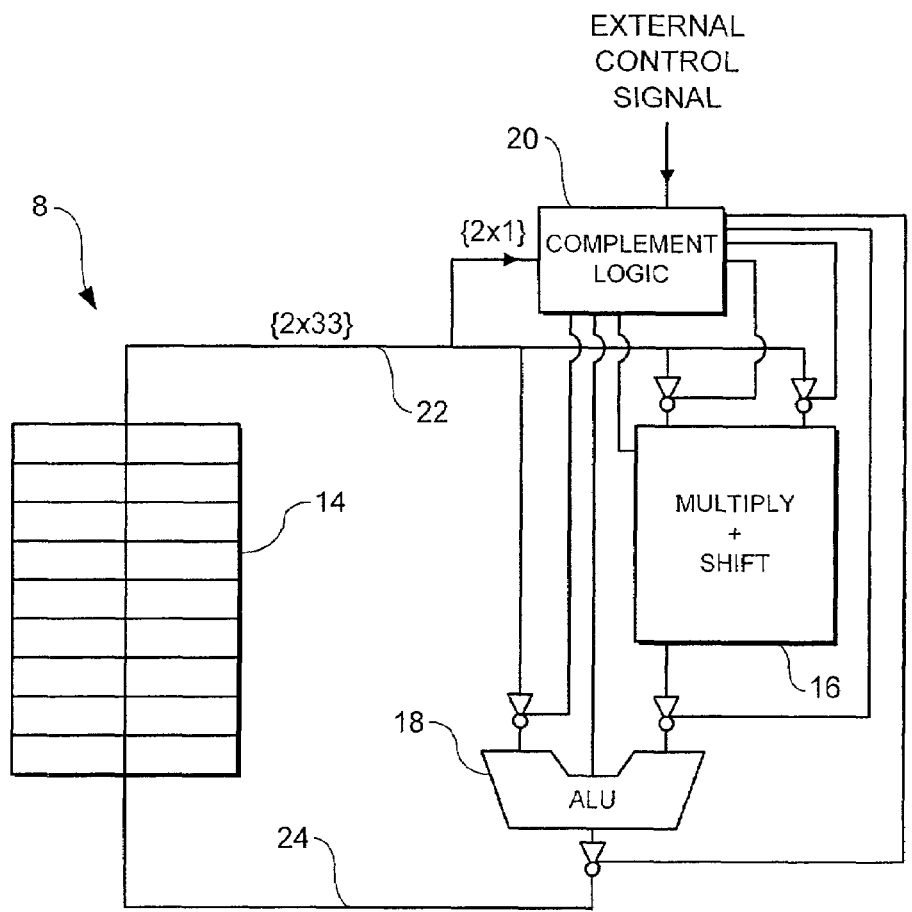
FIG. 3 schematically represents hardware elements between which a data value is transferred using a selectable data value representation.

FIG. 3 schematically illustrates a portion of the core 8 which includes a register bank 14, a multiply and shift circuit 16, an arithmetic logic unit (ALU) 18 and a representation control circuit 20. The register bank 14 is coupled to the multiply and shift circuit 16 and the ALU 18 via a read port data bus 22 and a write port data bus 24 of the register bank 14. Data values stored within the register bank 14 to be manipulated by the multiply and shift circuit 16 and the ALU 18 are read from the particular registers specified within a data processing instruction operand commanding the operation via the read port data bus 22 and supplied to the relevant one of the multiple and shift circuit 16 and the ALU 18. The result of the processing operations performed are written back to the register bank 14 via the write port data bus 24. The reading of data values to be manipulated and the writing of data values representing the results of manipulations is in itself a standard technique. The present technique modifies this normal behaviour by, in this example embodiment, providing adding an additional complement (polarity) bit which is associated with each data value stored in each register of the register bank 14 and passed together with that data value on the data busses 22, 24 to indicate the representation being used for the data value. Thus, the data busses 22, 24 transferring 32-bit data values become 33-bits in width since an additional complement bit is transmitted with the data value to indicate whether the data value is being represented in its true form or as a complement of its true form (i.e. each bit of the true form is inverted to form the complement form).

Depending upon the representation being used for the data values being processed and the processing operation being performed, it may or may not be necessary to convert data values back to their true form before they are processed. As an example, many logical operations to be performed on true data values can be mapped into corresponding operations to be performed on data values represented in their complement form with the result represented in a complement form. A particular example of this is that an AND operation to be performed upon two true data values can be mapped into an OR operation performed on two complement data values with a complement data value result being produced. In this way, if both data values supplied to the ALU 18 have a true representation, then neither need be converted into a different representation before use and the processing operation being performed can remain an AND operation as specified by the program instruction concerned. If one of the data values to be subject to the AND operation is in a complement form and the other is in a true form, then the data value in a complement form may be converted into a true form prior to the AND operation being performed. If both data values are in a complement form, then they can remain in this complement form and be subject to an OR operation rather than an AND operation to produce a result which is a complement representation of the result that would be produced by the AND operation on the true representations. This complement result would have its complement bit set to show it is a complement representation of the true result.

It is also possible that whilst the representations may be such that conversions prior to processing need not be made in order to achieve the desired result, these can be made and the operation mapped onto a different operation merely for the purpose of obscuring the operation of the system under control of an external control signal. Such an external signal could be driven by a random source, a pseudo random source or a program control signal or in other ways as desired by the system designer. This external signal may serve to introduce ("seed") complement values into the system to start the obscured processing.

It is known that in many systems flags are used to indicate particular conditions associated with processing operations that have been performed. When operating on complement data rather than true data, such flags may also need to be manipulated. As an example, if a data value in complement form is being shifted, then the carry flag should be made the complement of that which would normally be produced. This has the effect that the complement form data value can be shifted without the need to convert it into its true value and yet the correct carry flag value obtained. The possibilities for different mappings between processing operations performed upon true data values and complement data values and also the associated flag values are many and will be apparent from Boolean arithmetic considerations.

It would also be possible to produce an embodiment in which the data processing operations where always performed upon the true values with complement values being transformed into true values prior to the manipulation being performed. Since the majority of the capacitance associated with the data path is typically provided by the data busses 22, 24, then such a technique will still be effective in obscuring the power signature of the data transfers and manipulations being performed.

As illustrated in FIG. 3, the representation control circuit 20 is responsive to the complement bits associated with the representations of the data values transferred upon the read port data bus 22 to control inverters at the inputs to the multiply and shift circuit 16, the ALU 18 and the output from the ALU18. In this way, data values may be converted between representations prior to being manipulated and outputs converted prior to being written back into the register bank 14. In practice the inverters shown in FIG. 3 may already be provided within the ALU18, the multiply and shift circuit 16 or elsewhere and may be reused for the purpose of performing the transformations between representations desired in accordance with this technique. The representation control circuit 20 can also be used to switch the processing operations to be performed by the multiply and shift circuit 16 or the ALU 18 in accordance with the techniques described above, i.e. changing AND operations into OR operations, inverting the carry flags and the like. The external control signal supplied to the representation control circuit 20 may be used to randomly, pseudo randomly or under program control alter whether a particular data value is represented in its true or complement form by controlling the inverter which is on the write path to the register bank 14 such that result values are transformed or not transformed in a manner that obscures the operations being performed and the data content of the system.

Figure 4:
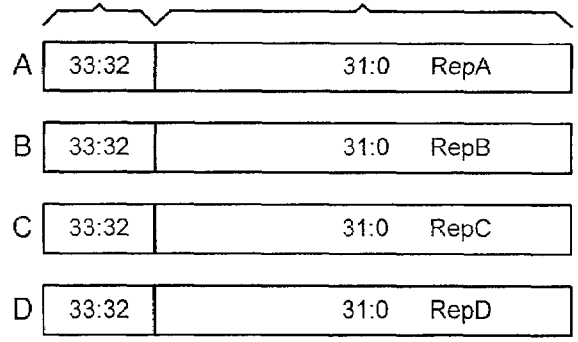
FIG. 4 schematically illustrates four different representations of a data value.

FIG. 4 schematically illustrates a system in which four different data representations may be used as indicated by a 2-bit representation specifying field. Different portions of a data word may be represented in different ways and there are many other possibilities. One example would be that respective half words could be represented in true or complement form giving four different overall representations of a full data word.

Figure 5:
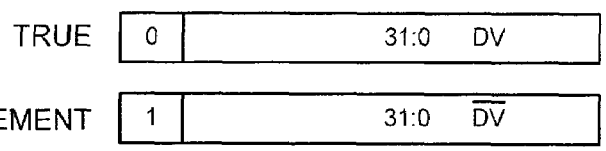
FIG. 5 schematically illustrates a data value represented in true form and complement form.

FIG. 5 illustrates the two data representations used in the embodiment of FIG. 3, namely a true representation and a complement representation as indicated by a 1-bit field which is associated with each data value, stored together with it within the register bank 14 and transferred with it on the data busses 22, 24.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
    a data source operable to supply a data value to be processed;
    a destination operable to receive said data value; and
    a data bus operable to transfer a representation of said data value between said data source and said destination;
    wherein one or more representation specifying bits are associated with said data value transferred on said data bus, said one or more representation specifying bits specifying which of a plurality of different representations of said data value is used to transfer said data value via said data bus between said data source and said destination, and
    wherein said one or more representation specifying bits accompany said data value transferred on said data bus and said one or more representation specifying bits are a complement bit specifying whether said data value is represented in a true form or a complement form, and wherein said apparatus is one of:
a smart card;
a cryptographic device; and
a secure device.

2. Apparatus as claimed in claim 1, wherein said data source is a register.

3. Apparatus as claimed in claim 1, wherein said destination is a data processing circuit operable to perform processing operations upon said data value.

4. Apparatus as claimed in claim 3, wherein said one or more representation specifying bits control said data value processing circuit to processes said representation of said data value in a manner dependent upon which of said plurality of different representations is specified such that a desired processing is performed whichever representation is being used.

5. Apparatus as claimed in claim 3, wherein said representation of said data value may be changed prior to processing by said data value processing circuit in dependence upon a type of data processing operation to be performed.

6. Apparatus as claimed in claim 3, wherein said representation of said data value may be changed prior to processing by said data value processing circuit in dependence upon a representation used for one or more other data values being processed.

7. Apparatus as claimed in claim 3, wherein said representation of said data value may be changed to a direct representation of said data value prior to processing by said data value processing circuit in dependence upon a type of data processing operation to be performed.

8. Apparatus as claimed in claim 3, wherein said data source is a register and said register is part of a register bank storing a plurality of data values to be processed by said data value processing circuit in dependence upon data processing instructions having register specifying operands.

9. Apparatus as claimed in claim 3, wherein said data value processing circuit includes an arithmetic logic unit operable to perform arithmetic and logical operations upon data values.

10. Apparatus as claimed in claim 1, wherein said data value is stored in said data source as said representation of said data value.

11. Apparatus as claimed in claim 10, wherein said data source is a register operable to store said data value in one of a plurality of different storage formats.

12. Apparatus as claimed in claim 1, wherein said one or more representation specifying bits are transferred with said representation of said data value on said data bus.

13. Apparatus as claimed in claim 1, wherein said one or more representation specifying bits are stored with said data value in said data source.

14. Apparatus as claimed in claim 1, wherein a representation selecting input receives a representation selecting signal which selects which representation is used for a data value to be processed.

15. Apparatus as claimed in claim 14, wherein said representation selecting signal is provided by one of:
a random signal source;
a pseudo-random signal source; and
a program controlled signal source.

16. Apparatus as claimed in claim 1, wherein said plurality of different representations serve to obscure operation of said apparatus.

17. Apparatus as claimed in claim 1, wherein said plurality of different representations serve to obscure a power signature of a transfer of said data value via said data bus.

18. Apparatus as claimed in claim 1, wherein said data source, said destination and said data bus are part of a processor core.

19. Apparatus as claimed in claim 1, wherein at least one data value to be transferred via said data bus is a confidential data value.

20. A method of processing data in a data processing apparatus, said method comprising the steps of:
supplying from a data source a data value to be processed; and
transferring a representation of said data value between said data source and a destination via a data bus; wherein
one or more representation specifying bits are associated with said data value supplied by said data source, said one or more representation specifying bits specifying which of a plurality of different representations of said data value is used to transfer said data value via said data bus between said data source and said destination,
wherein said one or more representation specifying bits accompany said data value transferred on said data bus and said one or more representation specifying bits are a complement bit specifying whether said data value is represented in a true form or a complement form, and
wherein said apparatus is one of:
a smart card;
a crypotographic device; and
a secure device.

21. A method as claimed in claim 20, wherein said data source is a register.

22. A method as claimed in claim 20, wherein said destination is a data value processing circuit and further comprising the step of performing processing operations upon said data value with said data value processing circuit.

23. A method as claimed in claim 22, wherein said one or more representation specifying bits control said data value processing circuit to process said representation of said data value in a manner dependent upon which of said plurality of different representations is specified such that a desired processing is performed whichever representation is being used.

24. A method as claimed in claim 22, wherein said representation of said data value may be changed prior to processing by said data value processing circuit in dependence upon a type of data processing operation to be performed.

25. A method as claimed in claim 22, wherein said representation of said data value may be changed prior to processing by said data value processing circuit in dependence upon a representation used for one or more other data values being processed.

26. A method as claimed in claim 22, wherein said representation of said data value may be changed to a direct representation of said data value prior to processing by said data value processing circuit in dependence upon a type of data processing operation to be performed.

27. A method as claimed in claim 22, wherein said data source is a register and said register is part of a register bank storing a plurality of data values to be processed by said data value processing circuit in dependence upon data processing instructions having register specifying operands.

28. A method as claimed in claim 22, wherein said data value processing circuit includes an arithmetic logic unit operable to perform arithmetic and logical operations upon data values.

29. A method as claimed in claim 20, wherein said data value is stored in said data source as said representation of said data value.

30. A method as claimed in claim 20, wherein said data source is a register operable to store said data value in one of a plurality of different storage formats.

31. A method as claimed in claim 20, wherein said one or more representation specifying bits are transferred with said representation of said data value on said data bus.

32. A method as claimed in claim 20, wherein said one or more representation specifying bits are stored with said data value in said data source.

33. A method as claimed in claim 20, wherein a representation selecting input receives an representation selecting signal which selects which representation is used for a data value to be processed.

34. A method as claimed in claim 33, wherein said representation selecting signal is provided by one of:
   a random signal source;
   a pseudo-random signal source; and
   a program controlled signal source.

35. A method as claimed in claim 20, wherein said plurality of different representations serve to obscure processing operation.

36. A method as claimed in claim 20, wherein said plurality of different representations serve to obscure a power signature of a transfer of said data value via said data bus.

37. A method as claimed in claim 20, wherein said data source, said destination and said data bus are part of a processor core.

38. A method as claimed in claim 20, wherein at least one data value to be transferred via said data bus is a confidential data value.

39. Apparatus for processing data said apparatus comprising:
   a store operable to store a data value and one or more representation specifying bits associated with said data value, said one or more representation specifying bits specifying which of a plurality of different representations of said data value is used to store said data value within said store,
   wherein said one or more representation specifying bits accompany said data value transferred on said data bus and said one or more representation specifying bits are a complement bit specifying whether said data value is represented in a true form or a complement form, and
   wherein said apparatus is one of:
   a smart card;
   a cryptographic device; and
   a secure device.

40. A method of processing data, said method comprising:
   storing a data value and one or more representation specifying bits associated with said data value, said one or more representation specifying bits specifying which of a plurality of different representations of said data value is used to store said data value within a store,
   wherein said one or more representation specifying bits accompany said data value transferred on said data bus and said one or more representation specifying bits are a complement bit specifying whether said data value is represented in a true form or a complement form, and
   wherein said apparatus is one of:
   a smart card;
   a cryptographic device; and
   a secure device.

\* \* \* \* \*